United States Patent
Worrall et al.

(10) Patent No.: US 10,052,552 B2
(45) Date of Patent: Aug. 21, 2018

(54) SYSTEMS AND METHODS FOR ASSOCIATION OF VIRTUAL GAMING TO PHYSICAL ENVIRONMENTS

(71) Applicant: Disney Enterprises, Inc., Burbank, CA (US)

(72) Inventors: John David Worrall, Clermont, FL (US); Shannon R. Monroe, Windermere, FL (US); Jose Villeta, Playa Vista, CA (US); Joshua B. Gorin, Glendale, CA (US); Brian J. Wilson, Davenport, FL (US); Robert Lowe, Layton, UT (US); Robert Nelson, Studio City, CA (US)

(73) Assignee: Disney Enterprises, Inc., Burbank, CA (US)

( * ) Notice: Subject to any disclaimer, the term of this patent is extended or adjusted under 35 U.S.C. 154(b) by 518 days.

(21) Appl. No.: 14/724,791

(22) Filed: May 28, 2015

(65) Prior Publication Data

US 2016/0346683 A1 Dec. 1, 2016

(51) Int. Cl.
| | |
|---|---|
| *A63F 13/26* | (2014.01) |
| *A63F 13/71* | (2014.01) |
| *A63F 13/79* | (2014.01) |
| *A63F 13/216* | (2014.01) |
| *A63F 13/65* | (2014.01) |
| *A63F 13/69* | (2014.01) |

(52) U.S. Cl.
CPC ............ *A63F 13/26* (2014.09); *A63F 13/216* (2014.09); *A63F 13/65* (2014.09); *A63F 13/69* (2014.09); *A63F 13/71* (2014.09); *A63F 13/79* (2014.09)

(58) Field of Classification Search
None
See application file for complete search history.

(56) References Cited

U.S. PATENT DOCUMENTS

| | | | |
|---|---|---|---|
| 8,475,275 B2 * | 7/2013 | Weston | A63H 30/04 463/30 |
| 9,597,584 B1 * | 3/2017 | George | A63F 13/00 |
| 2006/0178968 A1 * | 8/2006 | Jung | G06Q 20/06 705/35 |
| 2006/0293103 A1 * | 12/2006 | Mendelsohn | G06Q 30/02 463/42 |
| 2006/0293110 A1 * | 12/2006 | Mendelsohn | A63G 1/00 472/137 |
| 2011/0028219 A1 * | 2/2011 | Heatherly | A63H 3/28 463/42 |
| 2012/0047002 A1 * | 2/2012 | Patel | G06Q 30/0207 705/14.1 |
| 2012/0258802 A1 * | 10/2012 | Weston | A63H 30/04 463/37 |

(Continued)

*Primary Examiner* — Robert T Clarke, Jr.
(74) *Attorney, Agent, or Firm* — Sheppard Mullin Richter & Hampton LLP

(57) ABSTRACT

A system for associating virtual activity of a user in a virtual space and a real-world activity of a user in a physical environment are presented herein. User activities and/or experiences within the physical environment and/or the virtual environment may be created (e.g., new experiences/personalizations being presented to the user), changed, accelerated, and/or otherwise managed such that each one enhances the other and/or enriches the overall experiences of the users over time.

38 Claims, 4 Drawing Sheets

(56) References Cited

U.S. PATENT DOCUMENTS

| | | | | |
|---|---|---|---|---|
| 2013/0045804 A1* | 2/2013 | Ruke | A63G 31/00 | |
| | | | 463/42 | |
| 2014/0325394 A1* | 10/2014 | Hamill | G06Q 30/0209 | |
| | | | 715/753 | |
| 2014/0357344 A1* | 12/2014 | Grier | G07F 17/32 | |
| | | | 463/25 | |
| 2015/0050994 A1* | 2/2015 | Mangold | A63F 13/213 | |
| | | | 463/31 | |
| 2015/0258440 A1* | 9/2015 | Zhang | A63F 13/00 | |
| | | | 463/31 | |
| 2016/0253842 A1* | 9/2016 | Shapira | G02B 27/017 | |
| | | | 345/633 | |
| 2017/0120148 A1* | 5/2017 | Yim | A63F 13/52 | |
| | | | 3/52 | |
| 2017/0337768 A1* | 11/2017 | Shamilov | G07F 17/3227 | |

* cited by examiner

SYSTEMS AND METHODS FOR ASSOCIATION OF VIRTUAL GAMING TO PHYSICAL ENVIRONMENTS

FIELD OF THE DISCLOSURE

This disclosure relates to associations between virtual spaces and physical environments to provide personalizations in the virtual spaces and/or physical environments.

BACKGROUND

Video games may take place in a virtual space. The virtual space may be hosted over a network, such as the Internet, to client computing platforms used by users of the video game. In some implementations of video games hosted over a network, the video games may be referred to as online games. In some implementations, a virtual space may be hosted locally at a client computing platform. For example, the client computing platform may be a gaming console (e.g., XBOX, PLAYSTATION, etc.). The virtual space may be provided to users through local hosting at the client computing platform. Information used to host the virtual space may be information that is local to the client computing platform (e.g., via a game disc, cartridge, memory card, etc.). These types of games may be referred to as console games. Users may participate in the video games by controlling game entities (e.g., a virtual character) in the virtual space. Activity of the user in the virtual space may be monitored and/or stored by the system hosting the virtual space.

Physical environments, such as theme parks, may include attractions available with the environment. Users present in the environment may perform activities such as attending attractions, going to different locations within the physical environment, purchasing real-world goods (e.g., toys, food, etc.), and/or other activities. The activities of users in the physical environment may be monitored, gathered, and/or otherwise stored by technologies present in the physical environment.

SUMMARY

One or more aspects of the disclosure relates to a system for associating virtual activity and real-world activity of users. Association of user activity between the physical environment and the virtual space may result in personalizations being implemented in the virtual space and/or physical environment.

In some implementations, user activity in a virtual space may result in one or more personalizations being made in a physical environment for one or more associated users. A personalization in a physical environment may correspond to, for example, a real-world attribute of user experience in a physical environment. A personalization may correspond specifically to a user with which the personalization may be associated. A personalization may include a change, addition, removal, enhancement and/or other personalization of a real-world attribute of user experience in a physical environment. By way of non-limiting example, a real-world attribute of user experience may correspond to a real-world activity, a real-world location, a real-world permission, a real-world restriction, and/or other attributes. By way of non-limiting example, a real-world attribute of user experience may be associated with purchases available to a user, services available to a user, rides and/or attractions available for participation by a user, and/or other considerations. By way of non-limiting example, a personalization corresponding to a real-world attribute of user experience may include providing a discount on a purchase of a real-world good and/or service available in a physical environment.

In some implementations, user activity in a physical environment may result in one or more personalizations being made in a virtual space for one or more associated users. A personalization in a virtual space may correspond to, for example, a virtual attribute of user experience in a virtual space. A personalization may correspond specifically to a user with which the personalization may be associated. A personalization may include a change, addition, removal, enhancement and/or other personalization of a virtual attribute of user experience in a virtual space. By way of non-limiting example, a virtual attribute of user experience may correspond to a virtual activity, a virtual location, a virtual permission, a virtual restriction, and/or other attributes. By way of non-limiting example, a virtual attribute of user experience may be associated with one or more of a virtual item available to a user in a virtual space, a game taking place a virtual space, a mode of gameplay available to a user in a virtual space, other virtual space content, and/or other considerations. By way of non-limiting example, a personalization corresponding to a virtual attribute of user experience may include providing a virtual item to a user in the virtual space.

In some implementations, user activity in a physical environment may result in one or more personalization being made in a physical environment. In some implementations, a physical environment that may be personalized may be the same physical environment associated with user activity. In some implementations, a physical environment that may be personalized may be a different physical environment than the physical environment associated with the user activity.

In some implementations, user activity in a virtual space may result in one or more personalization being made in a virtual space. In some implementations, a virtual space that may be personalized may be the same virtual space associated with user activity. In some implementations, a virtual space that may be personalized may be a different virtual space than the virtual space associated with the user activity.

In some implementations, a system may be provided in which user experiences in both the virtual space and the physical environment are mutually benefited based on user activity in one or the other. As a result, user activities and/or experiences within a physical environment and/or a virtual environment may be created (e.g., new experiences/personalizations being presented to the user), changed, accelerated, enhanced, and/or otherwise managed, such that each one enhances the other and/or enriches the overall experiences of the user over time.

In some implementations, the system may comprise one or more physical processors configured to execute one or more computer program components. The components may include a user component, an activity component, a personalization component, and/or other components.

The user component may be configured to maintain activity histories of users. The activity histories may include information that reflects activities performed by the users in one or more virtual spaces and one or more physical environments. The activity histories may include a first activity history that includes at least one activity performed by a first user in the virtual space. The activities histories may include at least one activity performed by the first user in the physical environment.

The activity component may be configured to receive activity information related the activities of users in both a virtual space and a physical environment. The activity component may be configured to include the received activity information in the activity histories of the users (e.g., maintained by the user component). For example, responsive to receiving information related to a first activity performed by a first user in a virtual space and a second activity performed by the first user in a physical environment, the activity component may be configured to include the information related to the first activity and the second activity in the first activity history of the first user.

The personalization component may be configured to determine personalizations of the physical environment for the users based on the activities performed by the users in the virtual space. The personalization component may be configured to determine personalizations of the virtual space for the users based on the activities performed by the users in the physical environment. For example, the personalization component may be configured to determine personalizations of the physical environment for the first user based on the first activity and/or to determine personalizations of the virtual space for the first user based on the second activity.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
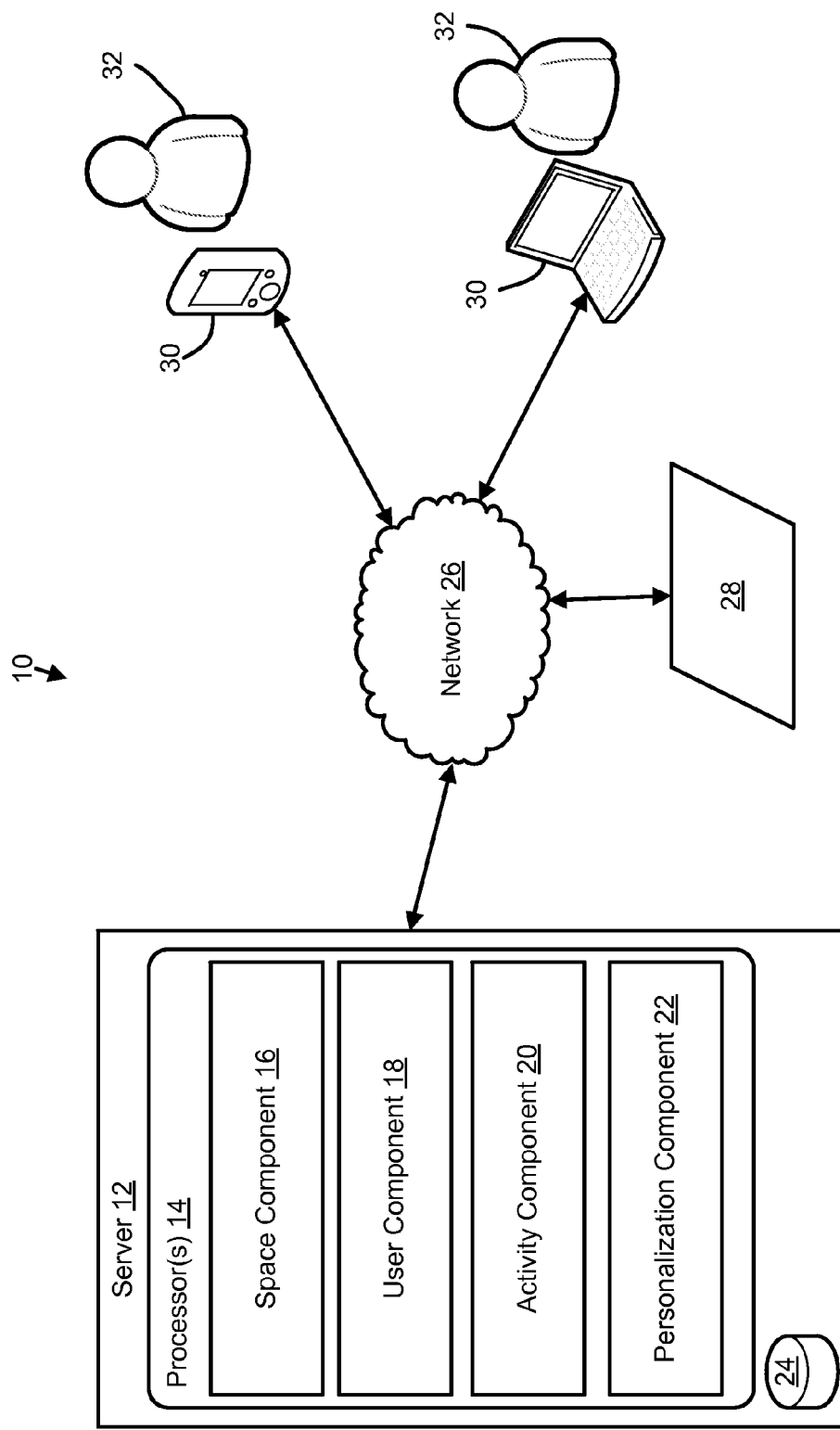
FIG. 1 illustrates a system for associating virtual activity with real-world activity of users.

FIG. 1 illustrates a system 10 for associating user virtual activity and real-world activity. In some implementations, virtual activity may correspond to one or more activities performed by users in a virtual space. A virtual space may include a video game taking place in the virtual space, a social network, a blog, a webpage, a media streaming webpage (e.g., Youtube®, Netflix®, Hulu®, HBO®, and/or other considerations), an application (e.g., an "app"), a virtual space provided by a set-top box and/or smart TV, combinations thereof, and/or other considerations. By way of non-limiting example, virtual activity may correspond to one or more activities performed by the users in a video game that takes place in the virtual space, a social network, a blog, a webpage, a media-streaming webpage, an app, a virtual space provided by a set-top box and/or smart TV, combinations thereof, and/or other considerations. It is noted that, although one or more implementations may be directed to users' virtual activity being associated with activity within a video game, other implementations may be considered wherein the virtual activity may relate to activity within in one or more other types of virtual spaces (e.g., a social network, a blog, a webpage, a media-streaming webpage, an app, a virtual space provided by a set-top box and/or smart TV, combinations thereof, and/or other considerations).

In some implementations, a virtual space may be hosted over a network 26, such as the Internet. The virtual space may include a video game taking place in the virtual space. A video game may be an online game. In some implementations, the virtual space may be hosted locally on client computing platforms 30 associated with the users 32 (e.g., a console game). In some implementations, the video game may be an "offline" version of the online game. It is noted that, although the user devices are described herein as "client" computing devices, it is to be understood that, in implementations where the virtual space is hosted locally at the computing device, the computing device may not, in fact, be operating as a "client" device.

Virtual activity may correspond to one or more activities performed by the users in a video game taking place in a virtual space (and/or other type of virtual space such as a non-gaming space). Examples of activities performed in the video game may include, without limitation, controlling a game entity in the virtual space (e.g., moving to one or more virtual locations within the virtual space, and/or other considerations), participating in a gameplay event, achieving a goal, achieving a score, achieving a status, achieving a rank, completing a game level, acquiring a virtual object, purchasing a virtual object, spending an amount of virtual currency, spending an amount of real currency, selling a virtual object, interacting with another user of the virtual space, interacting with a group of users of the virtual space, generating content in the virtual space, sharing user-generated content with other users, playing the video game for a period of time, not playing the video game for a period of time, and/or other considerations of activities performed by the user that are related to the virtual space and/or video game.

Events in a video game include one or more of a tournament, match, campaign, battle, co-play, and/or other considerations of events related to gameplay in the video game and/or virtual space. Users may participate in events by controlling game entities in the virtual space. A game entity may refer to an object (or group of objects) present in the virtual space that represents an individual user. A game entity may be a virtual character, a group of characters (e.g., a troop) and/or other considerations. User performance in the events may be quantitatively measured. A quantitative measure of performance may include a rank, position, status, score, and/or other considerations.

A virtual object may include a virtual item and/or a virtual good, a game entity, a group of game entities, and/or other considerations of virtual objects. Virtual items and/or goods may include one or more of a virtual weapon, a tool, a food, a currency, a reward, a bonus, health, a potion, an enhancement, a mount, a power-up, a speed-up, virtual clothing (e.g., shirt, hat, pants, etc.), a photograph (e.g., physical representation or image likeness of the end user), a video, a vehicle, an anatomical feature of a character or game entity, a troop or troop type, a pet, a virtual resource, and/or other considerations of virtual items and/or goods. Virtual items and/or virtual goods may be usable within the virtual space and/or the video game that takes place in the virtual space.

Users may socially interact with other users in the virtual space. For example, a user may control a game entity within the virtual space to move the game entity to a location in the virtual space where another user's controlled game entity may be located. The users may simultaneously control their respective game entities throughout the topography of the virtual space, may engage in one or more gameplay events, may communicate through in-game communications, and/or other considerations of social interaction.

Users may generate content in a virtual space. For example, users may generate content in the virtual space by creating a customized version of a virtual space. Users may generate content related to the topography of the virtual space (e.g., topographical elements, upgrades, display skins, etc.). Users may select and/or arrange virtual objects to be included in the topography of the virtual space. Users may generate content related to a game entity (e.g., a customized virtual character). Users may generate content related to rules and/or restrictions of gameplay. Users may restrict access by other users to the user-generated content. Users may invite other users to interact with the user-generated content in the virtual space. User-generated content may be considered in other ways.

In some implementations, real-world activity may correspond to one or more activities performed by users in one or more physical environments. For example, the physical environment may be a theme park, cruise ship, a movie theater, a store, a sports complex, convention center, a restaurant, a public space (e.g., a park, a zoo, and/or other considerations), a private space (e.g., a user's home and/or other considerations), and/or other considerations. In some implementations, the virtual space and/or the video game taking place in the virtual space and a physical environment may be related. By way of non-limiting example, a physical environment may include an attraction while a virtual space may include a virtual embodiment of the attraction.

Examples of activities performed in a physical environment may include, without limitation, traveling to a particular location in the physical environment, traveling a distance within the physical environment, participating in an attraction included in the physical environment, purchasing real-world items and/or goods offered for sale in the physical environment, purchasing virtual items and/or goods offered for sale in the physical environment, taking a photograph and/or video in the physical environment, interacting with other users in the physical environment, interacting with objects present in the physical environment, and/or other considerations of activities that may be performed in the physical environment.

In some implementations, a physical environment may include, for example, a theme park, a cruise ship, a theater, a store, a sports complex, a convention center, a restaurant, a public space, a private space, and/or other considerations. As an illustrative example, in the case of a theme park and/or other environment, the physical environment may include one or more attractions available in the physical environment. Attractions may include one or more of a ride, a tour, a show, a movie, a game, a character portrayed by an actor, and/or other considerations. The physical environment may be capable of tracking, gathering, and/or otherwise managing user activities and activity information in the physical environment.

In some implementations, a virtual space may be related to a physical environment (e.g., a theme park, a cruise ship, a movie theater, a store, a sports complex, convention center, a restaurant, a public space, a private space, and/or other considerations). For example, a relationship between a virtual space (e.g., video game and/or other considerations) and a physical environment (e.g., a theme park and/or other considerations), may be established by and/or otherwise employ, at least in part, a common syntax and/or taxonomy for relating physical and virtual activities.

As an illustrative example, a "user X" present at a theme park such as Disneyland® may purchase Mickey ears in the park, and/or other considerations. This activity may be described by a common syntax, for example, as "USER X of type GUEST ACQUIRES via MONETARY PURCHASE an ITEM of type CLOTHING of subtype HEADWEAR labeled MICKEY EARS belonging to FRANCHISE MICKEY MOUSE", and/or other considerations. This syntax may be syntax that is commonly employed by, and/or otherwise known to, for example, a Mickey video game and/or other virtual space, and/or other considerations. In accordance with one or more implementations presented herein, this real-world activity (purchasing an item), may relate and/or be related to one or more personalizations of a virtual space. For example, a character (e.g., game entity) played by "user X" in a video game may be modified to depict a virtual representation of ears, a Mickey character in the game may respond in one or more ways (e.g., get "excited" and/or other considerations), and/or other virtual activity and/or virtual space enhancement may be carried out. It is noted that the above description of common syntax and/or taxonomy that may be established and/or otherwise carried out between the physical environment and virtual space is provided for illustrative purposes only and is not to be considered limiting. Instead, the above description may be considered an illustration as to how, at least in part, associations and/or results of association between physical activities and virtual activities may be carried out by one or more implementations of the system 10, described herein. As such, common syntax and/or taxonomy may be considered in other ways. For example, common syntax and/or taxonomy may be specific to one or more physical environments and/or virtual spaces, and/or may be a general syntax and/or taxonomy that provide a "universal" language within one or more implementations of the system 10.

In some implementations, a virtual space and/or a video game taking place in the virtual space and one or more physical environments may be unrelated (e.g., by theme, syntax, and/or other considerations). In some implementations, the virtual space may be thematically unrelated to the physical environment; however, it may be related commonly by syntax and/or taxonomy.

In some implementations, users present in a physical environment may be associated with one or more detectable objects that are held, attached, and/or otherwise associated with the users. A detectable object may include, for example, a physical object such as a toy, a card, a wristband, clothing, an element of clothing, and/or other considerations. A detectable object may store information associated with the user, such as an identification of the user (e.g., name, a serial number, a username used in a virtual space, and/or other considerations), activity information related to activities performed by the user within the physical environment, activity information related to activities performed by the user within the virtual space, and/or other considerations. Detectable objects may include elements that facilitate detectability and/or communication of the detectable objects with readers of the detectable objects. Elements may include a scanable bar code, a quick response (QR) code, radio-frequency identification (RFID) tag, an antenna, and/or other considerations. In some implementations, detectable objects may be able to communicate with other detectable objects (e.g., send and receive RF transmissions, communicate through wired communications via one or more ports disposed on the objects, and/or other considerations).

In some implementations, the physical environment may include readers configured to detect and communicate with detectable objects associated with users. Readers may include, for example, a RFID reader, a bar code (and/or QR code) scanner, a computing platform, and/or other considerations. The readers may be able to receive information stored by the detectable objects, transmit information to the detectable objects, receive information input directly by the users, and/or have more or less functionality. In some implementations, readers may comprise a stationary (or moving) kiosk, a handheld reader (e.g., scanner), a point-of-sale platform (e.g., cash register), a mobile device such as a cell phone, smart phone, and/or mobile gaming device, and/or other considerations.

In some implementations, readers may be positioned throughout a physical environment. Users may interact with the readers by communicating with the readers using associated detectable objects. In some implementations, the communication of the readers with detectable objects may be automatic (e.g., the user simply passes by the reader, taps their detectable object on the reader, and/or other considerations). In some implementations, the communication of the readers with the detectable object may require active participation by the users (e.g., the users directly enter a username, code, log-in information, scan their fingerprints, irises, faces, and/or other considerations, enter a description of an activity being performed, and/or other considerations).

In some implementations, users may interact with readers without the use of detectable objects. For example, a user, with or without a detection of a detectable object by the reader, may input a username (and/or other identifying and/or descriptive information) into a reader (e.g., kiosk and/or other reader having input capabilities, and/or other considerations). Direct input from a user may be effectuated by virtue of a keyed entry (e.g., a keyboard), voice entry, motion detection, visual detection (e.g., a camera, scanner, and/or other considerations), combinations thereof, and/or other considerations. In some implementations, users and/or activities of the users may be detected by interactions with characters portrayed by actors that are present in a physical environment. For example, users may speak their user name, a code, a password, a secret word and/or phrase, and/or other information to the character portrayed by the actor (e.g., an activity they participated in and/or an activity they plan to participate in, and/or other considerations). The conveyance of this information from the user to the character portrayed by the actor may comprise at least some of the direct input required by the user, and/or other considerations. The character portrayed by the actor may then activate a "detection" of the user by providing input to a reader that may be carried by and/or associated with the character portrayed by the actor, and/or other considerations. This may provide a technique to communicate information not only about the location of the user (e.g., based on the location of the actor) but also the one or more activities of the user (e.g., including the "visit" to the character portrayed by the actor), and/or other information.

Readers present in a physical environment may communicate with one or more of a central server, processor, database, and/or electronic storage that may be included and/or otherwise associated with the physical environment. Information received and/or transmitted by the readers may be communicated to the one or more of a central server, processor, database, and/or electronic storage associated with the physical environment and stored. The one or more of the central server, processor, database, and/or electronic storage associated with the physical environment may be physically located at the physical environment. The one or more of the central server, processor, database, and/or electronic storage associated with the physical environment may be remote from the physical environment. The communication and/or storage of information associated with readers may be considered in other ways.

Information received and/or transmitted by a reader may correspond to activities performed by users in a physical environment and/or other information associated with the users, be stored by the detectable objects associated with the users, be directly input by the users, and/or other considerations. For example, information received and/or transmitted by the readers may correspond to the locations in the physical environment the users visited, the attractions the users visited, real-world person(s) the users have visited (e.g., actors portraying characters), real-world experiences the users have participated in, real-world experiences the users plan on participating in, items the users purchased and/or plan on purchasing, and/or may include information about other activities performed by the users in the physical environment as presented herein and/or other considerations.

In accordance with one or more implementations of system 10, information related to activities performed by users in a virtual space and/or a physical environment may be maintained in activity histories of the users. Activity histories may include information related to activities performed by the users in a virtual space and/or a physical environment based on information being received by one or more resources that store and/or otherwise manage such information. Briefly, the activity histories may provide a basis, at least in part, by which user activities and/or experiences within the physical environment and/or the virtual environment may be created (e.g., new experiences being presented to the user), changed, accelerated, enhanced, and/or otherwise managed, such that each one enhances the other and/or enriches the overall experiences of the user over time. For example, new experiences and/or activities may be presented and/or otherwise made available to the users that reflect past and/or planned activities and/or experiences to create a long-running lifetime of connected and/or otherwise shared interactions of the user within the physical environment and/or virtual space.

As an illustrative example, activity histories may include information related to the activities performed by a user at a physical environment. These activity histories may be received from a resource that is associated with the physical environment (e.g., readers, one or more of a server, a processor, and/or electronic storage that may be associated with the physical environment).

Activity histories may include information related to the activities performed by a user within a virtual space. Activity histories may be received from a client computing platform (and/or computing platform) used by a user to participate in a virtual space and/or video game that takes place in the virtual space. In some implementations, activity histories including information related to the activities performed by a user in a virtual space may be received from a server, processor, database, and/or electronic storage configured to maintain the activity histories (e.g., the server may execute the virtual space and monitor user activity, store and/or otherwise maintain the activity histories in electronic storage, and/or other considerations).

In some implementations, virtual activities and real-world activities of users may be associated and/or otherwise connected in some way. Virtual activity and real-world activity may be associated insofar that activities of the users in the virtual space may be reflected as personalizations in the physical environment, and/or activities of the users in the physical environment may be reflected as personalizations in the virtual space. This association may be considered a type of shared experience history that may be used as a technique with which new and/or accelerated experiences/personalizations can be provided to the users, in accordance with one or more implementations of the system 10 presented herein.

In some implementations, personalizations of a physical environment may be determined based on one or more activities performed by users in one or more virtual spaces. A personalization of a physical environment may correspond to a real-world attribute of user experience in a physical environment. In some implementations, a real-world attribute of user experience may be related to the activities performed in a virtual space (e.g., determined by the activity histories). In some implementations, a real-world attribute of user experience may be unrelated to activities performed in the virtual space.

In some implementations, a personalization may include a change, addition, removal, enhancement and/or other personalization of a real-world attribute of user experience in a physical environment. By way of non-limiting example, a real-world attribute of user experience may correspond to a real-world activity, a real-world location, a real-world permission, a real-world restriction, and/or other attributes. In some implementations, a real-world activity may correspond to attending an attraction (e.g., a ride, a show, a parade, a visit with a character portrayed by an actor, and/or other considerations), purchasing a real-world item, selling a real-world item, socializing with one or more users, trading real-world items, and/or other considerations. In some implementations, a real-world location may correspond to an attraction (e.g., a line for the attraction, a specific area within an attraction, and/or other considerations), a shop, a storefront, and/or other specific area and/or areas within a physical environment, and/or other considerations.

In some implementations, a permission may be associated with faster access to rides and/or attractions (e.g., "front of line" privileges), a membership status, and/or other considerations. In some implementations, a restriction imposed on the user may be associated with restricted access to locations in the physical environment, restricted access to rides and/or attractions in the physical environment, a membership status, and/or other considerations.

By way of non-limiting example, a personalization corresponding to a real-world attribute of user experience in a physical environment may include providing an offer and/or a discount on a purchase in the physical environment, displaying and/or presenting information related to the user in the physical environment (e.g., in an attraction), permitting or restricting a reduction in a wait time for an attraction available in the physical environment, changing a membership status of a user, and/or other considerations.

Displaying and/or presenting information related to a user in a physical environment may include displaying and/or presenting information related to the user in an attraction that is attended by the user in the physical environment and/or other considerations. In some implementations, a personalization of a real-world attribute of user experience provided to a user in a physical environment based on activity performed in a virtual space may be related to the activity performed in the virtual space. By way of non-limiting example, an activity performed by a user in a virtual space may include generating content within the virtual space and/or other considerations. The content generated may include, for example, a customized virtual character, virtual building, virtual world, virtual item and/or good, and/or other considerations. A personalization of a real-world attribute of user experience in the physical environment based on the activity in the virtual space may include presenting some or all of the user-generated content in a display of an attraction attended by the user in the physical environment, and/or other considerations.

In some implementations, an activity performed by a user in a virtual space may include using a particular game entity (e.g., a pirate game entity, and/or other considerations) during gameplay in a game taking place in the virtual space. By way of non-limiting example, a personalization of a real-world attribute of user experience in the physical environment may include informing a real-world embodiment of the game entity (e.g., a character portrayed by an actor in the physical environment) of information about the user (e.g., a name, a score, a rank, and/or other information) when the user visits the character in the physical environment. By way of non-limiting example, a user may walk up to a character in a physical environment and the character may be informed (e.g., via a reader or other device available to the character), of the name of the user a score achieved by the user in the game, and/or other considerations. Displaying and/or presenting information related to the user in the physical environment may be considered in other ways.

In some implementations, personalizations to real-world attributes of user experience may be considered in other ways. By way of non-limiting example, an attraction may be a ride having an objective such as shooting targets that are presented during the ride and achieving points based on performance, and/or other considerations. A personalization may include handicapping the user's experience with the ride by providing a predetermined number of points to the user at the start of the ride, increasing the point "payout" per successful shot at a target, and/or other considerations.

In some implementations, a personalization corresponding to a real-world attribute of user experience provided to a user in a physical environment based on an activity performed by the user within a virtual space may be related to the activity performed in the virtual space. By way of non-limiting example, an activity performed in a virtual space may include achieving a score in a game that takes place in the virtual space. The game in the virtual space may relate to a theme (e.g., a movie, character, time period, etc.). A personalization corresponding to a real-world attribute of user experience may be an enhancement to the attraction that relates to the same theme (e.g., the attraction related to the theme of the video game, and/or other considerations). In some implementations, the personalization corresponding to a real-world attribute of user experience may be an enhancement to an attraction based on a performance of the user in the virtual space (e.g., the score achieved by the user in the virtual space resulting in a handicapping of the user's score in the ride based on the score in the video game). Personalizations of an attraction may be considered in other ways.

In some implementations, personalizations of a virtual space may be determined based on one or more activities performed by users in one or more physical environments (e.g., determined by the activity histories). A personalization of a virtual space may correspond to a virtual attribute of user experience in a virtual space. In some implementations, a virtual attribute of user experience may be related to activities performed in a physical environment (e.g., determined by the activity histories). In some implementations, a virtual attribute of user experience may be unrelated to activities performed in a physical environment.

In some implementations, a personalization may include a change, addition, removal, enhancement and/or other personalization of a virtual attribute of user experience in a virtual space. By way of non-limiting example, a virtual attribute of user experience may correspond to a virtual activity, a virtual location, a virtual permission, a virtual restriction, and/or other attributes. In some implementations, a virtual activity may correspond to performing a task in a virtual space, achieving an objective, goal, rank, and/or status, purchasing a virtual items and/or good, selling a virtual items and/or good, socializing with one or more other users in the virtual space, trading a virtual items and/or good, and/or other considerations. In some implementations, a virtual location may correspond to one or more specific locations within a virtual space, one or more specific locations within a game taking place in the virtual space, a user-generated location, a social location, and/or other considerations.

In some implementations, a permission granted to a user in a virtual space may be associated with access to virtual space content such as a level, a boss, a non-player character, a special move and/or ability, a virtual item and/or good, a code or "cheat," a mode of gameplay, a visual aspect of the virtual space, and/or other considerations. In some implementations, a restriction imposed on a user in virtual space may be associated with locking (e.g., restricting access) a level, a boss, a non-player character, a special move or ability, a virtual item and/or good, a code and/or "cheat", a mode of gameplay, and/or other aspect of gameplay that may be restricted to a user.

By way of non-limiting example, a personalization corresponding to a virtual attribute of user experience in the virtual space may include, without limitation, unlocking and/or otherwise providing a virtual object (and/or other virtual content) to the user, unlocking and/or otherwise providing a new ability for a game entity associated with the user, a change, addition, and/or removal of content of the virtual space (e.g., a visual change in the topography and/or other considerations), an achievement (e.g., increase in rank, score, position, and/or other considerations), handicapping a gameplay event in a video game that takes place in the virtual space, and/or other considerations.

In some implementations, a personalization corresponding to a virtual attribute of user experience in a virtual space that includes a virtual object being provided to the user based on one or more activities performed by the user in the physical environment may be related to an activity performed in a physical environment. By way of non-limiting example, an activity performed by a user in a physical environment may be a purchase of a particular real-world good, a past purchase of one or more real-world goods (e.g., identified in the physical environment at a point of sale reader, described in an activity history of the user, and/or other considerations), and/or other considerations. As an illustrative example, a real-world product may be a toy figurine and/or other considerations. The toy figurine may physically represent a character (e.g., an action hero, a pirate, and/or other considerations) and/or other entity. A personalization corresponding to a virtual attribute of user experience may include unlocking a virtual object (e.g., a game entity) representing the same character as the toy for the user in the virtual space, and/or other considerations.

Other considerations of providing virtual objects and/or other content to users in the virtual space based on one or more activities performed in the physical environment may be implemented. The virtual objects and/or other content may or may not be related to a physical environment activity (e.g., a game entity unrelated to the toy may be unlocked, and/or other considerations).

In some implementations, a personalization corresponding to a virtual attribute of user experience may include a change, addition, removal, enhancement, and/or other personalization of visual content of the virtual space. In some implementations, a personalization in a virtual space based on one or more activities performed in the physical environment may be related to the one or more physical environment activities. By way of non-limiting example, a real-world activity may include taking a photograph at an attraction available in a physical environment. A personalization of a virtual space based on this activity may include the photograph appearing in the virtual space (e.g., as a background, skin, decal, logo, and/or other consideration) and/or other considerations.

In some implementations, a personalization corresponding to a virtual attribute of user experience may include handicapping a gameplay event in a game that takes place in the virtual space based on one or more activities performed in a physical environment. In some implementations, the handicapping (and/or other personalization) may be related to the one or more physical environment activities. By way of non-limiting example, an activity in a physical environment may include attending an attraction that has an objective of scoring points. A personalization corresponding to a virtual attribute of user experience based on the activity in the physical environment may include handicapping a gameplay event that takes place in the virtual space by the same amount of points (or variation thereof).

The disclosure presented herein provides a system in which user experiences in both the virtual space and the physical environment are mutually benefited based on user activity in one or the other. Thus, a user may have an ongoing experience that may start in one or both of the virtual space and physical environment, and continues on through both via the various benefits provided to the user. Activity histories may be considered such that benefits may provide an ongoing connection to one or more past activities performed by the user, current activities of the user, and/or other considerations.

In some implementations, user activity in a physical environment may result in one or more personalization being made in a physical environment. In some implementations, a physical environment that may be personalized may be the same physical environment associated with user activity. In some implementations, a physical environment that may be personalized may be a different physical environment than the physical environment associated with the user activity.

In some implementations, user activity in a virtual space may result in one or more personalization being made in a virtual space. In some implementations, a virtual space that may be personalized may be the same virtual space associated with user activity. In some implementations, a virtual space that may be personalized may be a different virtual space than the virtual space associated with the user activity.

In FIG. 1, in some implementations, providing the virtual space may include hosting the virtual space over the network 26, such as the Internet. The host server 12 may include one or more processors 14 configured to execute one or more computer components for implementing an instance of the virtual space and/or a video game (e.g., online game) taking place within the virtual space and to facilitate the participation of one or more users 32 in the virtual space and/or the online game. The users 32 may access the system 10 and/or virtual space via client computing platforms 30.

The computer program components may include one or more of a space component 16, a user component 18, an activity component 20, a personalization component 22, and/or other components.

In some implementations, providing the virtual space may include hosting the virtual space on the client computing platforms 30. For example, a client computing platform may be a gaming console and/or other computing platform. As described herein, although the client computing platforms 30 are described as "client" devices, one or more implementations of the system 10 may include computing platforms that are, in fact, not client devices. However, with that being said, the client computing platforms may be configured to execute an instance of the virtual space and/or video game taking place in the virtual space. The client computing platform may execute the virtual space using information stored by and/or local to the client computing platform (e.g., a game cartridge, game disk, memory card/stick, USB memory stick, electronic storage, and/or other considerations). In some implementations, a client computing platform configured to host a virtual space locally may be configured to communicate with server 12, for example, over network 26.

The client computing platforms 30 can include, for example, a cellular telephone, a smartphone, a laptop, a tablet computer, a desktop computer, a television set-top box, smart TV, a gaming console, and/or other device suitable for the intended purposes presented herein, and/or other considerations.

The space component 16 executed by the server 12 may be configured to implement an instance of a virtual space. The instance of the virtual space may be executed by the computer components to determine state of the virtual space. The state may then be communicated (e.g., via streaming visual data, via object/position data, and/or other state information) from server 12 to client computing platforms 30 for presentation to users 32. The state determined and transmitted to a given client computing platform 30 may correspond to a view for a user character (or other game entity) being controlled by a user 32 via input devices (e.g., a controller) at the given client computing platform 30. The state determined and presented to a given client computing platform 30 may correspond to a location in the virtual space (e.g., location in the game). The view described by the state for the given client computing platform 30 may correspond, for example, to the location from which the view is taken, the location the view depicts, and/or other locations, a zoom ratio, a dimensionality of objects, a point-of-view, and/or view parameters of the view. One or more of the view parameters may be selectable by the users 32.

An instance of a virtual space may comprise a simulated space that is accessible by users 32 via clients (e.g., client computing platforms 30) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). An instance executed by the computer components may be synchronous, asynchronous, and/or semi-synchronous.

The above description of the manner in which state of the virtual space is determined by space component 16 is not intended to be limiting. The space component 16 may be configured to express the virtual space in a more limited, or richer, manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place beyond the relatively generic graphics. For example, a view may include a generic battle graphic with a textual description of the opponents to be confronted. Other expressions of individual places within the virtual space are contemplated.

Within the instance(s) of the virtual space executed by space component 16, users 32 may control game entities, simulated physical phenomena (e.g., wind, rain, earthquakes, and/or other phenomena), and/or other elements within the virtual space to interact with the virtual space and/or each other. The game entities may include virtual characters such as avatars. As used herein, the term "game entity" may refer to an object (or group of objects) present in the virtual space that represents an individual user. The game entity may be controlled by the user 32 with which it is associated. The user-controlled element(s) may move through and interact with the virtual space (e.g., non-user characters in the virtual space and/or other objects in the virtual space). The user-controlled elements controlled by and/or associated with a given user 32 may be created and/or customized by the given user. The user may have an "inventory" of virtual items and/or currency that the user can use (e.g., by manipulation of a user character or other user-controlled element, and/or other items) within the virtual space.

The users 32 may participate in an instance of a virtual space by controlling one or more of the available user-controlled game entities in the virtual space. Control may be exercised through control inputs and/or commands input by the users through client computing platforms 30. The users 32 may interact with each other through communications exchanged within the virtual space. Such communications may include one or more of textual chat, instant messages, private messages, voice communications, and/or other communications. Communications may be received and entered by the users 32 via their respective client computing platforms 30. Communications may be routed to and from the appropriate users through server 12 (e.g., through space component 16) and/or through communications which are external to the system 10 (e.g., text messaging services associated with the client computing platforms 30).

The instance of the virtual space and/or the online game that takes place therein may be persistent. That is, the virtual space and/or the game may continue on whether or not individual players are currently logged in and/or participating in the game. A player who logs out of the virtual space and then logs back in some time later may find the virtual space has been changed through the interactions of other players with the virtual space during the time the player was logged out. These changes may include changes to the simulated physical space, changes in the player's inventory, changes in other player's inventories, changes experienced by non-player characters, changes to the virtual items available for use in the online game, and/or other changes.

In some implementations, some or all of the functionality of the space component 16 and/or other components may be attributed to the functions and/or processes executed by the client computing platforms 30. The client computing platforms 30 may be configured to host the virtual space locally (e.g., "offline" gameplay).

In FIG. 1, the user component 18 may be configured to access and/or manage one or more user profiles, user information, and/or user accounts associated with users 32 of the system 10. The one or more user profiles and/or user information may include information stored by server 12, one or more of the client computing platforms 30, and/or other storage locations. The user profiles may include, for example, information identifying users (e.g., a username or handle, a number, an identifier, and/or other identifying information) within the virtual space, security login information (e.g., a login code or password), virtual space account information, subscription information, virtual (or real) currency account information (e.g., related to currency held in credit for a user), virtual inventory information (e.g., virtual inventories associated with the users that include one or more virtual items available for the users in the virtual space), relationship information (e.g., information related to relationships between users in the virtual space), virtual space usage information (e.g., a login history indicating the frequency and/or amount of times the user logs in to the user accounts), demographic information associated with users, interaction history among users in the virtual space, information stated by users, browsing history of users, a client computing platform identification associated with a user, a phone number associated with a user, and/or other information related to users.

In some implementations, the user component 18 may be configured to maintain (e.g., store) activity histories of users that reflect activities performed by the users in one or more virtual spaces and/or one or more physical environments, and/or other considerations. Activity histories may include activity information related to activities of users in both a virtual space and a physical environment. In some implementations, the activity histories may be maintained in user accounts associated with the users and/or other considerations. User accounts may include virtual accounts that maintain activity histories related to activities performed by the users in the virtual space and/or other considerations. User accounts may include real-world accounts that maintain activity histories related to activities performed by the users in the physical environment and/or other considerations. User accounts may include joint accounts that maintain activity histories related to activities performed by the users in a virtual space and a physical environment, and/or other considerations.

Figure 2:
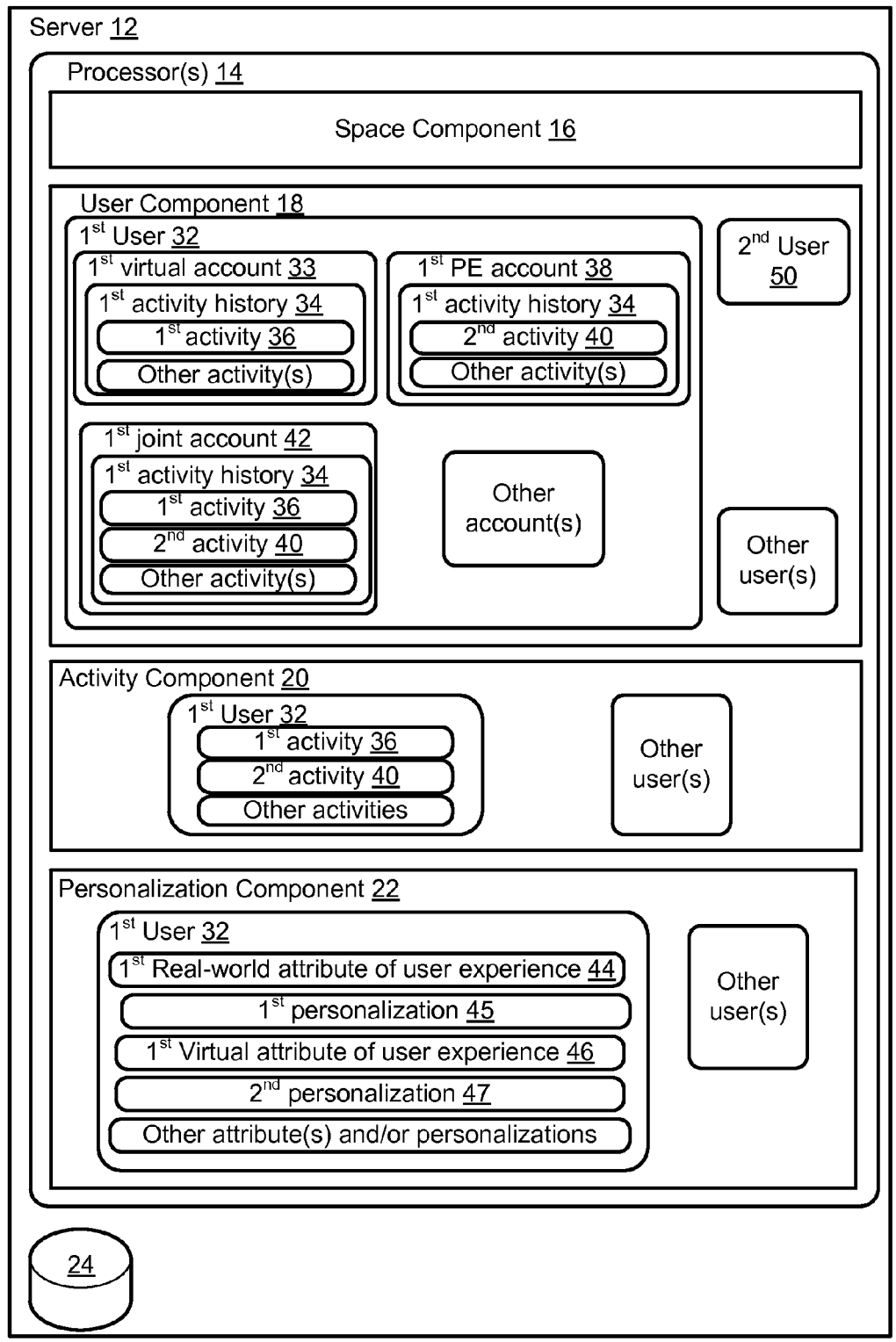
FIG. 2 illustrates an implementation of a server employed in the system of FIG. 1.

As an illustrative example, in FIG. 2, the user component 18 may be configured to maintain activity histories including a first activity history 34 and/or other considerations. The first activity history 34 may include information related to at least one activity performed by a first user 32 in the virtual space. The first activity history 34 may include information related to at least one activity performed by the first user 32 in a physical environment (e.g., a theme park and/or other considerations). In some implementations, one or more activities performed by the first user 32 in the virtual space may be maintained by a first virtual account 33 associated with the first user 32, and/or other considerations. In some implementations, one or more activities performed by the first user 32 in the physical environment may be maintained by a first physical environment account 38 (abbreviated first PE account 38) associated with the first user 32, and/or other considerations. In some implementations, one or more activities performed by the first user 32 in the physical environment and the virtual space that are included in the first activity history 34 may be maintained by a first joint account 42 associated with the first user 32, and/or other considerations. In some implementations, the activity histories may be maintained by one or more of the first virtual account 33, first physical environment account 38, first joint account 42, and/or other accounts.

Returning to FIG. 1, the activity component 20 may be configured to obtain activity information related to the activities of users in the virtual space and/or the physical environment. The activity component 20 may be configured to obtain information associated with the activity histories of the users (e.g., maintained by user component 18).

Information related to activities of users in the virtual space may be obtained from client computing platforms 30, the server 12, and/or other considerations. For example, in "offline" gameplay wherein client computing platforms 30 host the virtual space locally (with or without a connection to network 26), activity information may be stored locally at the client computing platforms 30. The locally stored activity information related to activities performed by the users in the virtual space may be sent to the server 12 (e.g., activity component 20). Sending of activity information may be automatic and/or may require user input. For example, a user participating in "offline" gameplay may be prompted to send (e.g., upload) stored activity information to the server 12.

Information related to activities of users in the virtual space may be obtained locally from the server 12. For example, activity information related to the activity of the users in the virtual space may be received by the space component 16 (or other component) insofar as the space component 16 (or other component) is configured to monitor, store, and/or otherwise acquire user activity information related to activities of the users in the virtual space executed by the space component 16. Activity information related to activities of users in the virtual space may be obtained from other sources. Information related to activities of users in the virtual space may be obtained from other considerations of resources that may be separate and/or local to the server 12.

Information related to activities of users in the physical environment may be obtained from one or more resources (e.g., external resources 28). The resources may be resources external to the system 10. The resources may be resources that are associated with the physical environment and/or other considerations. For example, as presented herein, the activity component 20 may be configured to receive information related to the activities of users in the physical environment from resources that are associated with the physical environment and/or that may be configured to collect, manage, and/or store such information (e.g., a reader, a sever, processor, database, and/or electronic storage associated with the physical environment). Information related to activities of users in the physical environment may be received from other considerations of resources that may be separate and/or local to the servers 12 and/or physical environment.

As an illustrative example, in FIG. 2, the activity component 20 may be configured to obtain activity information related to a first activity 36 performed by the first user 32 in the virtual space. The activity component 20 may be configured to, responsive to receiving the information related to the first activity 36 performed by the first user 32 in the virtual space, include the information related to the first activity 36 in the first activity history 34 of the first user 32 (e.g., in one or both of the first virtual account 33 and first joint account 42 of the user component 18), and/or other considerations.

The activity component 20 may be configured to receive activity information related to a second activity 40 performed by the first user 32 in the physical environment. The activity component 20 may be configured to, responsive to receiving the information related to the second activity 40 performed by the first user 32 in the physical environment, include the information related to the second activity 40 in the first activity history 34 of the first user 32 (e.g., in one or both of the first physical environment account 38 and first joint account 42 of the user component 18), and/or other considerations.

Returning to FIG. 1, the personalization component 22 may be configured to determine personalizations of a physical environment for users based on activities performed by the users in one or more virtual spaces. The personalization component 22 may be configured to determine personalizations of the virtual space for the users based on the activities performed by the users in the physical environment. In some implementations, a personalization may correspond to a virtual attribute of user experience in a virtual space and/or a real-world attribute of user experience in a physical environment as presented herein, and/or other considerations. Determining a personalization of the physical environment based on activity of a user in the virtual space may comprise determining one or more real-world attributes of user experience in the physical environment to be changed, added, removed, enhanced, and/or personalized in other ways for the user, determine one or more personalizations corresponding to the determined one or more real-world attributes of user experience, and/or other considerations. Determining a personalization of the virtual space based on activity of a user in the physical environment may comprise determining one or more virtual attributes of user experience in the virtual space to be changed, added, removed, enhanced, and/or otherwise personalized for the users, determining a personalization corresponding to the determined one or more virtual attributes of user experience, and/or other considerations.

In some implementations, determining personalizations in the physical environment and/or virtual space based on performance of one or more activities in the other may be based on a weighted measure of the one or more activities performed. For example, a weighted measure may correspond to one or more of a frequency of the performance of one or more activities, a quality of experience of the one or more performed activities, a time/date at which one or more activities were performed, a sequence in which one or more activities were performed, missed opportunities to perform an activity, social interactions which occurred during the performance of an activity, and/or other considerations. Such weighting may provide a technique in which personalization may be catered to one or more historical activities of the user (e.g., an activity that a user exceptionally enjoyed or disliked) and/or other considerations to thereby enrich the user's experience accordingly.

The frequency of the performance of the one or more activities in the virtual space and/or physical environment may affect the determination of the corresponding personalization and/or aspect of user experience. For example, performing a different number of activities over a given time period may correspond to different personalization of an attribute of user experience. As an illustrative example, a personalization corresponding to virtual attribute of user experience may be determined for a user based on the user attending 3 (or other amount) attractions (or performing other activities) in the physical environment. However, a different personalization corresponding to the same or different virtual attribute of user experience may be determined for the user based on the user attending 5 (or other amount) attractions (or performing other activities). In some implementations, a personalization corresponding to virtual attribute of user experience may relate to the attended attractions (and/or other activity).

In some implementations, a quality of a user's experience in one or more activities may affect a determination of a corresponding personalization of an attribute of user experience. A quality may be an aesthetic, an emotional reaction, a personal preference, a utilitarian property, and/or other considerations. As an illustrative example, a personalization corresponding to a virtual attribute of user experience may be determined for a user based on the user attending an attraction in a physical environment and the user indicating (e.g., via a reader) that they enjoyed the attraction. A different personalization corresponding to a different (or same) virtual attribute of user experience may be determined for the user based on the user attending the attraction in the physical environment and the user indicating that they did not enjoy the attraction.

A time and/or date at which one or more activities were performed may affect the determination of the corresponding personalization of an attribute of user experience. By way of non-limiting example, a personalization corresponding to a virtual attribute of user experience in a virtual space may be determined for a user based on the user attending an attraction in the physical environment on a specific date (e.g., a birthday, anniversary, and/or other date). A different personalization corresponding to a different (or same) virtual attribute of user experience may be determined for the user based on the user attending the attraction on a different date (e.g., a non-celebration).

In some implementations, a sequence in which one or more activities were performed may affect a determination of a corresponding personalization or an attribute of user experience. As an illustrative example, a personalization corresponding to a real-world attribute of user experience in a physical environment may be determined for a user based on the user performing a particular sequence of activities in the virtual space (e.g., completing a level, then participating in an event, then communicating with another user, and/or other considerations of sequences of activities). A different personalization corresponding to a different (or same) real-world attribute of user experience may be determined for the user based on the user performing a different sequence of activities in the virtual space.

In some implementations, missed opportunities to perform an activity may affect a determination of a corresponding personalization of an attribute of user experience. As an illustrative example, a personalization corresponding to a virtual attribute of user experience may be determined for a user based on the user performing a first activity in the physical environment which resulted in the user missing out on performing a second activity in the physical environment. A different personalization corresponding to a different (or same) virtual attribute of user experience may be determined for the user based on the user performing the second activity instead of the first activity.

In some implementations, social interactions that may occur during a performance of an activity may affect a determination of a corresponding personalization of an attribute of user experience. As an illustrative example, a personalization corresponding to a virtual attribute of user experience may be determined for a user based on the user performing an activity in a physical environment with another user or group of users. A different personalization corresponding to a different (or same) virtual attribute of user experience may be determined for the user based on the user performing an activity in the physical environment with a different other user or group of users.

In some implementations, a personalization determined for a user may be related to a social interaction of a user while performing an activity. By way of non-limiting example, a user may perform an activity in the virtual space with another user (e.g., participate in a gameplay event together). A personalization corresponding to a real-world attribute of user experience based on this activity in the virtual space may be determined that is related to the user interacting with the other user in the physical environment (e.g., a personalization corresponding to a real-world attribute of user experience may require the user to meet the other user in the physical environment).

As an illustrative example, in FIG. 2, the personalization component 22 may be configured such that determining personalizations of the physical environment for the first user 32 based on the first activity 36 in the virtual space comprises determining a first real-world attribute of user experience 44 in the physical environment for the first user 32 based on the first activity 36, determining a first personalization 45 to the first real-world attribute of user experience 44, and/or other considerations. In some implementations, the first real-world attribute of user experience 44, the first personalization 45 of the first real-world attribute of user experience 44, and/or the first activity 36 may be related (e.g., by a common theme). In some implementations, the first real-world attribute of user experience 44, the first personalization 45 of the first real-world attribute of user experience 44, and/or the first activity 36 may be unrelated. Provided below are non-limiting illustrative examples of a personalization of the first real-world attribute of user experience 44 based on the first activity 36.

In some implementations, the first activity 36 may correspond to the first user 32 controlling a game entity to a predetermined virtual location within the virtual space, and/or other considerations. The first real-world attribute of user experience 44 may correspond to a real-world-equivalent of the virtual location in the physical environment (e.g., the virtual location may be a virtual town, and the physical environment may have a real-world equivalent of the virtual town located in the physical environment) and/or other considerations. A personalization corresponding to a first real-world attribute of user experience 44 at the real-world-equivalent of the virtual location in the physical environment may be, for example, a personalization of an attraction available at the real-world-equivalent of the virtual location.

In some implementations, the first activity 36 may correspond to the first user 32 participating in a video game that takes place in the virtual space, and/or other considerations. A personalization of the first real-world attribute of user experience 44 may correspond to the performance of the first user 32 in the video game (see previous examples describing "handicapping" a user's score in a real-world attraction) and/or other considerations.

Figure 3:
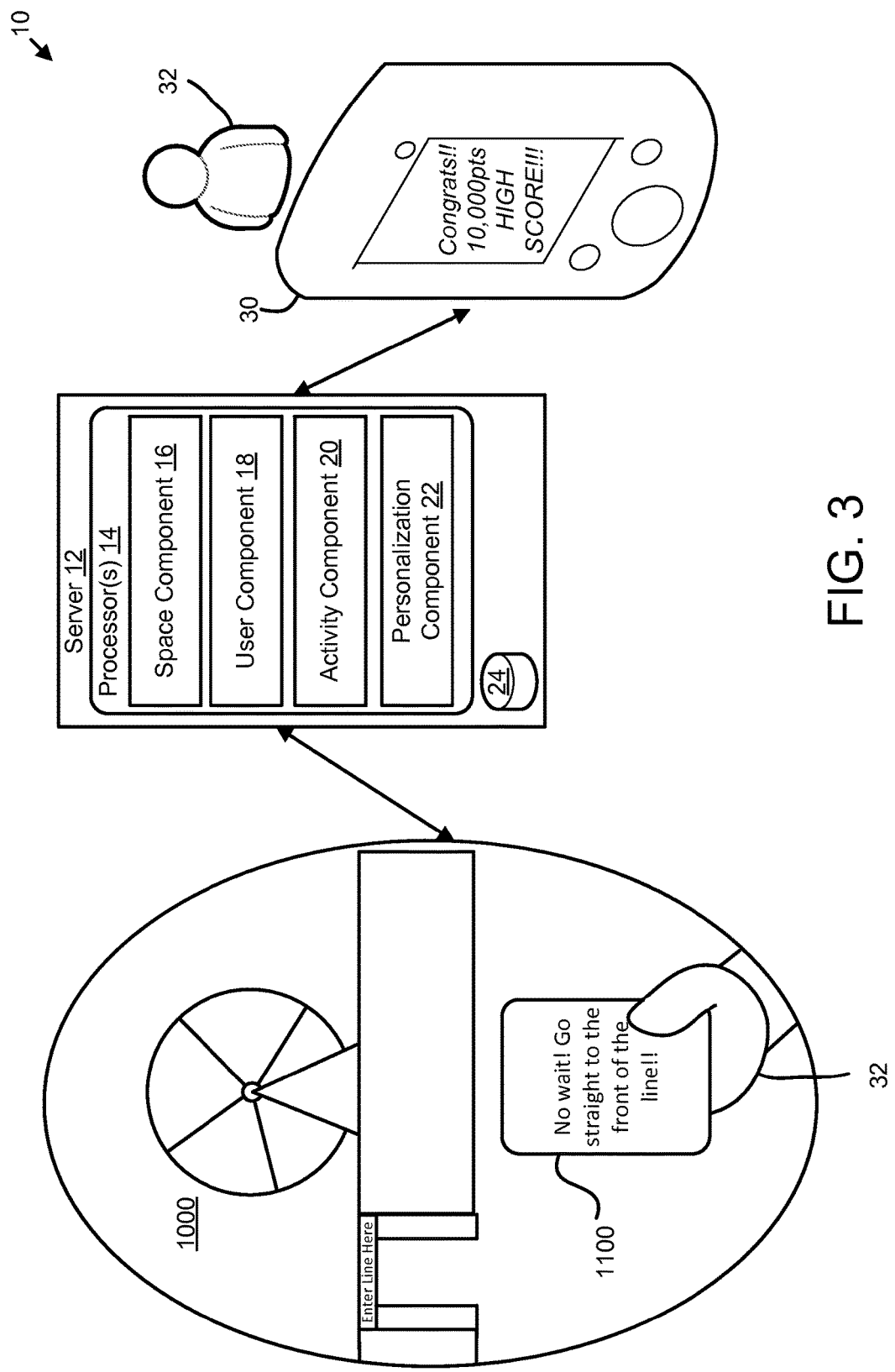
FIG. 3 illustrates an implementation of the system for associating virtual activity with real-world activity of users.

FIG. 3 depicts an illustrative example of the system 10 showing a personalization corresponding to a real-world attribute of user experience based on user activity (and/or activity history) in the virtual space. As shown, a user 32 may participate in the virtual space using a client computing platform 30. The user 32 may participate in a video game taking place in the virtual space and/or other considerations. The activity component 20 may obtain activity information from the client computing platform 30 related to the activities of the user 32 in the virtual space. For example, activity information may indicate that the user 32 achieved a score in the video game, and/or some other activity within the virtual space. The personalization component 22 may be configured to determine a personalization of a physical environment 1000 (e.g., a theme park and/or other considerations) based on the activity of the user 32 in the virtual space. For example, based on the user achieving a score in the video game, a real-world attribute of user experience may be determined for the user in the physical environment 1000. The real-world attribute of user experience may be associated with a given attraction (e.g., a Ferris wheel). A personalization 1100 corresponding to the real-world attribute of user experience may be determined. The personalization 1100 may include, for example, a "pass" that allows the user to reduce their wait time in the attraction (e.g., a ride, such as a Ferris wheel) available in the physical environment 1000, and/or other considerations. The "pass" may include, for example, a certificate that may be provided to the user 32 in the physical environment 1000, and/or other considerations.

Returning to FIG. 2, in some implementations, the first activity 36 may correspond to the first user 32 interacting with a second user 50 in the virtual space. The first real-world attribute of user experience 44 and/or first personalization 45 may correspond to the first user 32 interacting with the second user 50 in a physical environment and/or other considerations. In some implementations, the activity histories of both users may be considered when a personalization corresponding to the first real-world attribute of user experience 44 may be determined.

In some implementations, the first activity 36 may correspond to the first user 32 generating virtual content within the virtual space, and/or other considerations. The first real-world attribute of user experience 44 may be associated with an attraction. A personalization corresponding to the first real-world attribute of user experience 44 may correspond to the created virtual content being presented on a display in the physical environment and/or other considerations.

The personalization component 22 may be configured such that determining personalizations of the virtual space for the first user 32 based on the second activity 40 in the physical environment may comprise determining a first virtual attribute of user experience 46 in the virtual space for the first user 32, a second personalization 47 of the first virtual attribute of user experience 46, and/or other considerations. In some implementations, the first virtual attribute of user experience 46, the second personalization 47 of the first virtual attribute of user experience 46, and/or the second activity 40 may be related. In some implementations, the first virtual attribute of user experience 46, the second personalization 47 of the first virtual attribute of user experience 46, and/or the second activity 40 may be unrelated. Provided below are non-limiting illustrative examples of a personalization corresponding to the first virtual attribute of user experience 46 based on the second activity 40.

In some implementations, the second activity 40 may correspond to the first user 32 being in a predetermined location within the physical environment, and/or other considerations. A personalization corresponding to the first virtual attribute of user experience 46 may correspond to a change, addition, removal, enhancement, and/or other personalization of a virtual-world-equivalent of the predetermined location in the physical environment and/or other considerations.

In some implementations, the second activity 40 may correspond to the first user 32 traveling a predetermined distance within the physical environment, and/or other considerations. A personalization corresponding to the first virtual attribute of user experience 46 may correspond to the predetermined distance and/or other considerations. By way of non-limiting example, the user may travel a first distance. The first virtual attribute of user experience 46 may be a rank. A personalization of the first virtual attribute of user experience 46 may be an increase in the rank by the distance traveled, and/or other considerations.

In some implementations, the second activity 40 may correspond to the first user 32 performing a predetermined number of activities within the physical environment, and/or other considerations. A personalization corresponding to the first virtual attribute of user experience 46 may correspond to the performance (e.g., completion) of the predetermined number of activities (e.g., frequency of performance as presented herein) and/or other considerations. In some implementations, the physical environment may be a theme park, and the activities may be attending a predetermined number of attractions available in the theme park, and/or other considerations.

In some implementations, the second activity 40 may correspond to the first user 32 performing a predetermined sequence of activities within the physical environment, and/or other considerations. A personalization corresponding to the first virtual attribute of user experience 46 may correspond to the performance of the sequence of activities and/or other considerations.

In some implementations, the second activity 40 may correspond to the first user 32 interacting with the second user 50 in the physical environment, and/or other considerations. A personalization corresponding to the first virtual attribute of user experience 46 may correspond to the first user 32 interacting with the second user 50 in the virtual space and/or other considerations.

In some implementations, the second activity 40 may correspond to the first user 32 obtaining (e.g., purchasing) a physical object in the physical environment, and/or other considerations. A personalization corresponding to the first virtual attribute of user experience 46 may correspond to a virtual-object-equivalent of the physical object in the virtual space (e.g., the user may be provided the virtual-object-equivalent of the physical object within the virtual space) and/or other considerations.

In some implementations, the second activity 40 may correspond to the first user 32 taking a photo in the physical environment, and/or other considerations. A personalization corresponding to a first virtual attribute of user experience 46 may correspond to the photo (or a representation of the photo) being displayed in the virtual space and/or other considerations.

Returning to FIG. 1, the server 12, client computing platforms 30, and/or external resources 28 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 12, client computing platforms 30, and/or external resources 28 may be operatively linked via some other communication media.

The external resources 28 may include sources of information, hosts and/or providers of activity information that is outside of system 10, external entities participating with system 10, and/or other resources. In some implementations, some or all of the functionality attributed herein to external resources 28 may be provided by resources included in system 10.

The server 12 may include electronic storage 24, one or more processors 14, and/or other components. The server 12 may include communication lines or ports to enable the exchange of information with a network and/or other computing platforms. Illustration of server 12 in FIG. 1 is not intended to be limiting. The server 12 may include a plurality of hardware, software, and/or firmware components operating together to provide the functionality attributed herein to server 12. For example, server 12 may be implemented by a cloud of computing platforms operating together as server 12.

Electronic storage 24 may comprise electronic storage media that electronically stores information. The electronic storage media of electronic storage 24 may include one or both of system storage that is provided integrally (i.e., substantially non-removable) with server 12 and/or removable storage that is removably connectable to server 12 via, for example, a port or a drive. A port may include a USB port, a firewire port, and/or other port. A drive may include a disk drive and/or other drive. Electronic storage 24 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 24 may include one or more virtual storage resources (e.g., cloud storage, a virtual private network, and/or other virtual storage resources). Electronic storage 24 may store files, software algorithms, information determined by processor 14, information received from server 12, information received from client computing platforms 30, and/or other information that enables server 12 to function as described herein.

Processor(s) 14 is configured to provide information processing capabilities in server 12. As such, processor 14 may include one or more of a digital processor, an analog processor, a digital circuit designed to process information, an analog circuit designed to process information, a state machine, and/or other mechanisms for electronically processing information. Although processor 14 is shown in FIG. 1 as a single entity, this is for illustrative purposes only. In some implementations, processor 14 may include one or more processing units. These processing units may be physically located within the same device, or processor 14 may represent processing functionality of a plurality of devices operating in coordination. The processor 14 may be configured to execute components 16, 18, 20, 22. Processor 14 may be configured to execute components 16, 18, 20, 22 by software; hardware; firmware; some combination of software, hardware, and/or firmware; and/or other mechanisms for configuring processing capabilities on processor 14.

It should be appreciated that although components 16, 18, 20, 22 are illustrated in FIG. 1 as being co-located within a single processing unit, in implementations in which processor 14 includes multiple processing units, one or more of components 16, 18, 20, 22 may be located remotely from the other components. The description of the functionality provided by the different components 16, 18, 20, 22 described above is for illustrative purposes and is not intended to be limiting, as any of components 16, 18, 20, 22 may provide more or less functionality than is described. For example, one or more of components 16, 18, 20, 22 may be eliminated, and some or all of its functionality may be provided by other ones of components 16, 18, 20, 22 and/or other components. As another example, processor 14 may be configured to execute one or more additional components that may perform some or all of the functionality attributed below to one of components 16, 18, 20, 22.

Figure 4:
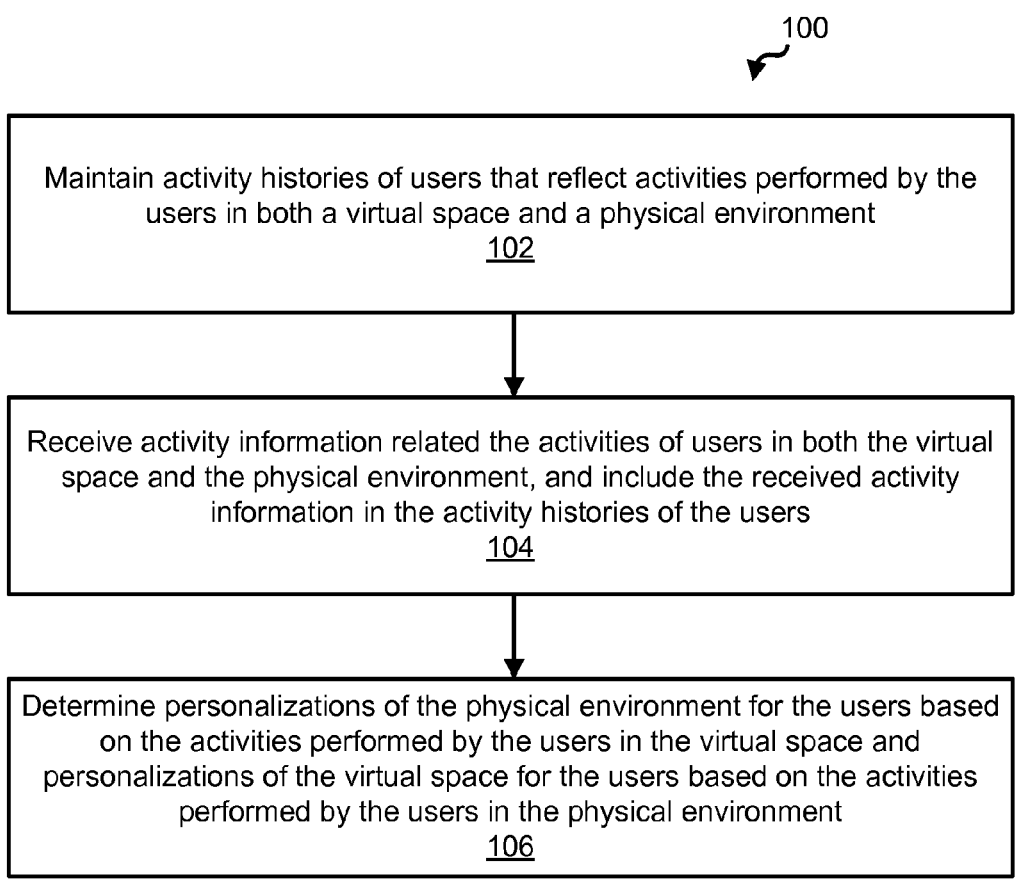
FIG. 4 illustrates an implementation of a method of associating virtual activity and real-world activity.

FIG. 4 illustrates a method 100 of associating virtual activity with real-world activity. The operations of method 100 presented below are intended to be illustrative. In some implementations, method 100 may be accomplished with one or more additional operations not described and/or without one or more of the operations discussed. Additionally, the order in which the operations of method 100 are illustrated in FIG. 4 and described below is not intended to be limiting.

In some implementations, method 100 may be implemented in one or more processing devices (e.g., a digital processor, an analog processor, a digital circuit designed to process information, an analog circuit designed to process information, a state machine, and/or other mechanisms for electronically processing information), and/or one or more other components. The one or more processing devices may include one or more devices executing some or all of the operations of method 100 in response to instructions stored electronically on an electronic storage medium. The one or more processing devices may include one or more devices configured through hardware, firmware, and/or software to be specifically designed for execution of one or more of the operations of method 100.

Referring now to method 100 in FIG. 4, at an operation 102, activity histories of users that reflect activities performed by the users in both a virtual space and a physical environment may be maintained. The activity histories may include a first activity history that includes at least one activity performed by a first user in the virtual space and at least one activity performed by the first user in the physical environment. In some implementations, operation 102 may be performed by a user component the same as or similar to user component 18 (shown in FIG. 1 and described herein).

At an operation 104, activity information related the activities of users in both the virtual space and the physical environment may be received. The received activity information may be included in the activity histories of the users. For example, responsive to receiving information related to a first activity performed by the first user in the virtual space and a second activity performed by the first user in the physical environment, information related to the first activity and the second activity may be included in the first activity history of the first user. In some implementations, operation 104 may be performed by an activity component the same as or similar to activity component 20 (shown in FIG. 1 and described herein).

At an operation 106, personalizations of the physical environment for the users based on the activities performed by the users in the virtual space and personalizations of the virtual space for the users based on the activities performed by the users in the physical environment may be determined. For example, personalizations of the physical environment for the first user based on the first activity may be determined. Personalizations of the virtual space for the first user based on the second activity may be determined. In some implementations, operation 106 may be performed by a personalization component the same as or similar to personalization component 22 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to associate virtual activity with real-world activity of users, the system comprising:
   one or more physical processors configured by computer-readable instructions to:
   maintain activity histories of the users that reflect activities performed by the users in both a virtual space and a physical environment, the activity histories including a first activity history that includes at least one activity performed by a first user in the virtual space and at least one activity performed by the first user in the physical environment;
   receive activity information related to the activities of the users in both the virtual space and the physical environment, and include the received activity information in the activity histories of the users, such that, responsive to receiving information related to a first activity performed by the first user in the virtual space and a second activity performed by the first user in the physical environment, the information related to the first activity and the second activity are included in the first activity history of the first user, the first activity including the first user participating in a video game that takes place in the virtual space;
   determine personalizations of the physical environment for the users based on the activities performed by the users in the virtual space and determine personalizations of the virtual space for the users based on the activities performed by the users in the physical environment, including determining a first personalization of the physical environment for the first user based on the first activity and determining a second personalization of the virtual space for the first user based on the second activity;
   determine the first personalization of the physical environment for the first user based on the first activity by determining a first real-world attribute of user experience in the physical environment to change, add, remove, and/or enhance, the first real-world attribute of user experience including a real-world performance score of a game to be played on a ride in the physical environment, the first personalization being determined based on a virtual performance score of the first user in the video game; and
   determine that the first personalization comprises handicapping the real-world performance score based on the virtual performance score prior to the first user playing the game in the physical environment.

2. The system of claim 1 wherein the one or more physical processors are configured by computer-readable instructions such that the activity histories that reflect the activities performed by the users in the virtual space are maintained by a virtual space user account associated with individual ones of the users and the activity histories that reflect the activities performed by the users in the physical environment are maintained by a physical environment user account associated with the individual ones of the users.

3. The system of claim 1 wherein the one or more physical processors are configured by computer-readable instructions such that the activity histories of the users that reflect the activities performed by the users in both the virtual space and the physical environment are maintained by a user account associated with individual ones of the users.

4. The system of claim 1, wherein the first real-world attribute of user experience and the first activity are related.

5. The system of claim 1, wherein the first real-world attribute of user experience and the first activity are unrelated.

6. The system of claim 1, wherein the first activity further includes the first user interacting with a second user in the video game taking place in the virtual space, wherein the first personalization requires the first user to interact with the second user in the game to be played on the ride in the physical environment.

7. The system of claim 1, wherein the first activity further includes the first user creating virtual content within the video game taking place in the virtual space, and wherein the first personalization further includes the created virtual content being presented in the game to be played on the ride in the physical environment.

8. The system of claim 1, wherein the one or more physical processors are configured by computer-readable instructions such that determining the personalizations of the virtual space for the first user based on the second activity comprises determining a first virtual attribute of user experience in the virtual space to change, add, remove, and/or enhance.

9. The system of claim 8, wherein the first virtual attribute of user experience and the second activity are related.

10. The system of claim 8, wherein the first virtual attribute of user experience and the second activity are unrelated.

11. The system of claim 8, wherein the second activity corresponds to the first user being in a predetermined location within the physical environment, and wherein the first virtual attribute of user experience corresponds to a virtual-world-equivalent of the predetermined location.

12. The system of claim 8, wherein the second activity corresponds to the first user traveling a predetermined distance within the physical environment, and wherein a personalization of the first virtual attribute of user experience corresponds to the predetermined distance.

13. The system of claim 8, wherein the second activity corresponds to the first user performing a predetermined number of activities within the physical environment, and wherein the first virtual attribute of user experience corresponds to the performance of the predetermined number of activities.

14. The system of claim 13, wherein the physical environment is a theme park, and the activities performed by the users in the physical environment include attending attractions available in the theme park.

15. The system of claim 8, wherein the second activity corresponds to the first user performing a predetermined sequence of activities within the physical environment and wherein the first virtual attribute of user experience corresponds to the performance of the sequence of activities.

16. The system of claim 15, wherein the physical environment is a theme park, and the activities performed by the users in the physical environment include attending attractions available in the theme park.

17. The system of claim 8, wherein the second activity corresponds to the first user interacting with a second user in the physical environment, and wherein the first virtual attribute of user experience corresponds to the first user interacting with the second user in the virtual space.

18. The system of claim 8, wherein the second activity corresponds to the first user obtaining a physical object in the physical environment, and wherein the first virtual attribute of user experience corresponds to a virtual-object-equivalent of the physical object in the virtual space.

19. The system of claim 8, wherein the second activity corresponds to the first user taking a photo in the physical environment, and wherein the first virtual attribute of user experience corresponds to the photo being displayed in the virtual space.

20. A method of associating virtual activity with real-world activity of users, the method being implemented in a computer system including one or more physical processors and storage media storing machine-readable instructions, the method comprising:

maintaining activity histories of the users that reflect activities performed by the users in both a virtual space and a physical environment, the activity histories including a first activity history that includes at least one activity performed by a first user in the virtual space and at least one activity performed by the first user in the physical environment;

receiving activity information related to the activities of the users in both the virtual space and the physical environment, and include the received activity information in the activity histories of the users, such that, responsive to receiving information related to a first activity performed by the first user in the virtual space and a second activity performed by the first user in the physical environment, the information related to the first activity and the second activity are included in the first activity history of the first user, the first activity including the first user participating in a video game that takes place in the virtual space;

determining personalizations of the physical environment for the users based on the activities performed by the users in the virtual space and determine personalizations of the virtual space for the users based on the activities performed by the users in the physical environment, including determining a first personalization of the physical environment for the first user based on the first activity and determining a second personalization of the virtual space for the first user based on the second activity;

determining the first personalization of the physical environment for the first user based on the first activity by determining a first real-world attribute of user experience in the physical environment to change, add, remove, and/or enhance, the first real-world attribute of user experience including a real-world performance score of a game to be played on a ride in the physical environment, the first personalization being determined based on a virtual performance score of the first user in the video game; and determining that the first personalization comprises handicapping the real-world performance score based on the virtual performance score prior to the first user playing the game in the physical environment.

21. The method of claim 20, wherein the activity histories that reflect the activities performed by the users in the virtual space are maintained by a virtual space user account associated with individual ones of the users and the activity histories that reflect the activities performed by the users in the physical environment are maintained by a physical environment user account associated with the individual ones of the users.

22. The method of claim 20, wherein the activity histories of the users that reflect the activities performed by the users in both the virtual space and the physical environment are maintained by a user account associated with individual ones of the users.

23. The method of claim 20, wherein the first real-world attribute of user experience and the first activity are related.

24. The method of claim 20, wherein the first real-world attribute of user experience and the first activity are unrelated.

25. The method of claim 20, wherein the first activity further includes the first user interacting with a second user in the video game taking place in the virtual space, wherein the first personalization requires the first user to interact with the second user in the game to be played on the ride in the physical environment.

26. The method of claim 20, wherein the first activity further includes the first user creating virtual content within the video game taking place in the virtual space, and wherein the first personalization further includes the created virtual content being presented in the game to be played on the ride in the physical environment.

27. The method of claim 20, wherein determining the personalizations of the virtual space for the first user based on the second activity comprises determining a first virtual attribute of user experience in the virtual space to change, add, remove, and/or enhance.

28. The method of claim 27, wherein the first virtual attribute of user experience and the second activity are related.

29. The method of claim 27, wherein the first virtual attribute of user experience and the second activity are unrelated.

30. The method of claim 27, wherein the second activity corresponds to the first user being in a predetermined location within the physical environment, and wherein the first virtual attribute of user experience corresponds to a virtual-world-equivalent of the predetermined location.

31. The method of claim 27, wherein the second activity corresponds to the first user traveling a predetermined distance within the physical environment, and wherein a personalization of the first virtual attribute of user experience corresponds to the predetermined distance.

32. The method of claim 27, wherein the second activity corresponds to the first user performing a predetermined number of activities within the physical environment, and wherein the first virtual attribute of user experience corresponds to the performance of the predetermined number of activities.

33. The method of claim 32, wherein the physical environment is a theme park, and the activities performed by the users in the physical environment include attending attractions available in the theme park.

34. The method of claim 27, wherein the second activity corresponds to the first user performing a predetermined sequence of activities within the physical environment, and wherein the first virtual attribute of user experience corresponds to the performance of the sequence of activities.

35. The method of claim 34, wherein the physical environment is a theme park, and the activities performed by the users in the physical environment include attending attractions available in the theme park.

36. The method of claim 27, wherein the second activity corresponds to the first user interacting with a second user in the physical environment, and wherein the first virtual attribute of user experience corresponds to the first user interacting with the second user in the virtual space.

37. The method of claim 27, wherein the second activity corresponds to the first user obtaining a physical object in the physical environment, and wherein the first virtual attribute of user experience corresponds to a virtual-object-equivalent of the physical object in the virtual space.

38. The method of claim 27, wherein the second activity corresponds to the first user taking a photo in the physical environment, and wherein the first virtual attribute of user experience corresponds to the photo being displayed in the virtual space.

* * * * *